United States Patent [19]

Kleine et al.

[11] 4,109,711
[45] Aug. 29, 1978

[54] HEAT EXCHANGE PANEL

[75] Inventors: Charles A. Kleine, Florissant, Mo.; Verne L. Middleton, East Alton, Ill.

[73] Assignee: Olin Corporation, New Haven, Conn.

[21] Appl. No.: 632,502

[22] Filed: Nov. 17, 1975

Related U.S. Application Data

[63] Continuation-in-part of Ser. No. 573,953, May 2, 1975.

[51] Int. Cl.² .................. F28F 3/14; F24J 3/02; F28F 9/22
[52] U.S. Cl. .................. 165/170; 29/157.3 V; 126/271; 165/174
[58] Field of Search ........... 29/157.3 V; 62/523; 165/170, 174; 126/271

[56] References Cited

U.S. PATENT DOCUMENTS

| 673,767 | 5/1901 | Eycleshymer | 165/174 |
|---|---|---|---|
| 1,124,740 | 1/1915 | Holt | 165/174 |
| 1,915,805 | 6/1933 | Sutcliffe | 165/174 |
| 1,994,903 | 3/1935 | Warrender | 29/157.3 V |
| 2,626,130 | 1/1953 | Raskin | 62/523 |
| 2,705,948 | 4/1955 | Rostock | 126/271 |
| 2,934,322 | 4/1960 | Hazard | 165/170 |
| 3,222,763 | 12/1965 | Heuer | 29/157.3 V |
| 3,239,000 | 3/1966 | Meagher | 165/170 |
| 4,020,827 | 5/1977 | Broberg | 126/271 |
| 4,027,821 | 6/1977 | Hayes et al. | 237/1 A |

FOREIGN PATENT DOCUMENTS

1,075,645  2/1960  Fed. Rep. of Germany ............ 62/523

Primary Examiner—Charles J. Myhre
Assistant Examiner—Sheldon Richter
Attorney, Agent, or Firm—Paul Weinstein; Robert A. Dawson

[57] ABSTRACT

A heat exchange panel possessing a system of internal tubular passageways connecting opposed headers, wherein said headers define an angle of at least 91° with respect to the direction of flow of a heat exchange medium passing therethrough, and said passageways are disposed at an angle of at least 1° with respect to said flow, said flow defined with respect to a longitudinal edge of said panel. The disposition of the headers and passageways provides improved and efficient drainage of fluid from the panel regardless of whether the longitudinal dimension of the panel is placed in the horizontal or the vertical plane.

9 Claims, 9 Drawing Figures

HEAT EXCHANGE PANEL

CROSS REFERENCE TO RELATED APPLICATION

The present application is a Continuation-In-Part of application Ser. No. 573,953, filed May 2, 1975, by the inventors herein.

BACKGROUND OF THE INVENTION

The present invention relates to metal panels having a system of internal tubular passageways disposed between spaced apart portions of the thickness of the panel. Said panels possess utility in heat exchange applications wherein a heat exchange medium is circulated through said passageways. A particular application of said panels resides in devices utilizing solar energy, and specifically, solar energy absorbing devices for elevating fluid temperature.

It is well known that the radiation of the sun can be collected as a source of energy for heating or cooling or for direct conversion to electricity. Heating and cooling depend upon collection of rays of solar energy in a fluid heating transfer system. The heated fluid is pumped or allowed to flow to a place of utilization for the thermal energy it has acquired.

In certain areas of the world, solar energy is the most abundant form of available energy if it could be harnessed economically. Even in more developed areas of the world, the economic harnessing of solar energy would provide an attractive alternative to the use of fossil fuels for energy generation.

One of the problems attending to the development of an efficient system for the conversion of solar energy resides with the structure and design of the solar energy absorbing device, or solar collector. This solar collector generally comprises a rectangular plate-like structure possessing channels or passageways for the circulation of the energy absorbing fluid medium. Conventionally, these panels have comprised a pair of opposed expanded passageways, known as headers, which are placed at opposite ends of the panel, and are connected by a plurality of tubular passageways which are often in parallel relation with respect to each other. These passageways, as well as the headers themselves, have generally been disposed at right angles with respect to each other and in parallel relation with respect to the horizontal and vertical dimensions, respectively, of the panel.

The aforementioned configuration suffers from certain deficiencies, in that fluid flow tends to encounter pockets of stagnation which cut down on the efficient circulation of solar energy. Further, various entrained gases tend to collect in the passageways, with the result that air locks which greatly inhibit flow and reduce the maximum fluid circulation capacity of the panel are often formed.

In our co-pending application Ser. No. 573,953, the disclosure of which is incorporated herein by reference, it was determined that improved flow was obtainable by a modification of the disposition of the headers wherein the headers define an angle of at least 91° with respect to the direction of flow of the heat exchange medium. Though this modification alleviates the aforementioned problems to an extent, it was felt that further improvement in flow was desirable in certain of the panel configurations. To this end the improvements embodied in the present invention were developed.

SUMMARY OF THE INVENTION

In accordance with the present invention, a heat exchanger is provided which possesses significantly improved efficiency, and specific utility in solar energy applications.

The panel of the present invention comprises a system of tubular passageways for a heat exchange medium defining opposed headers connected by connecting portions of said passageways extending therebetween, said passageways having entry and exit portions extending from opposite ends of said headers to provide ingress and egress openings for said heat exchange medium, wherein said headers define an angle of at least 91° with respect to the direction of flow of said heat exchange medium, and said connecting portions are disposed at an angle of at least 1° with respect to said direction of flow along substantially the entire length there of, said direction of flow defined with respect to a longitudinal edge of said panel.

In the preferred embodiment, the panel of the present invention comprises a system of internal tubular passageways for a heat exchange medium, said passageways disposed between spaced apart portions of the thickness of the panel to define opposed headers connected by connecting portions of said passageways extending therebetween. The internal passageways are provided with entry and exit portions extending from opposite ends of the headers to opposed edges of the panel in order to provide ingress and egress openings for the heat exchange medium. The headers define an angle of at least 91°, and generally from 92° to 100° with respect to the direction of flow of said heat exchange medium as determined with respect to a longitudinal edge of said panel. The connecting portions of said passageways extend in said panel in a direction transverse to and interconnecting said headers so as to define an angle of at least 1°, and generally from 2° to 10° with respect to said longitudinal edge. The connecting portions may extend in a generally longitudinal direction, although the placement of the headers with respect to the entry and exit portions may dictate extension in a generally transverse direction. Additionally, the headers may include portions of the metal which are bonded together to provide increased header strength, improved fluid flow control and directionality and a degree of interruption in the flow of the heat exchange medium.

The panels of the present invention possess several advantages. Specifically, the incline of the headers and connecting portions materially enhances the ability of heat exchange fluid to drain efficiently from the unit and to carry with it any collected gases, so as to prevent, in the latter instance, the occurence of pockets of air resulting in air locks, particularly in the instance where the panel is employed with the placement of the headers in a substantially vertical direction. Thus, the panel of the present may be mounted for efficient operation with its longitudinal dimension lying in either a vertical or a horizontal plane.

In addition to the above advantages, the panels of the present invention exhibit improved fluid flow control and directionality, as well as increased header strength, by the use of bonded portions provided in the headers.

As indicated above, the preferred embodiment of the present invention utilizes a metal panel having a system of internal fluid passageways, conventionally painted black, as will be described in more detail hereinbelow.

The concepts of the present invention may, however, also be advantageously utilized in heat exchangers generally, such as, for example, using extrusions. Since the concepts of the present invention are particularly advantageous in metal panels having a system of internal fluid passageways, the present invention will be specifically described hereinbelow utilizing this type of system.

Accordingly, it is a principal object of the present invention to provide a metal panel for use in heat exchange applications which enables the efficient and economical transfer of heat energy.

It is a further object of the present invention to provide a metal panel aforesaid which is particularly suited for use in a solar energy collector system.

It is yet a further object of the present invention to provide a metal panel as aforesaid which is efficiently designed to allow maximum utilization of internal passageway systems in a solar energy collector.

Further objects and advantages will become apparent to those skilled in the art as detailed description proceeds with reference to the following drawings.

DETAILED DESCRIPTION

Figure 1:
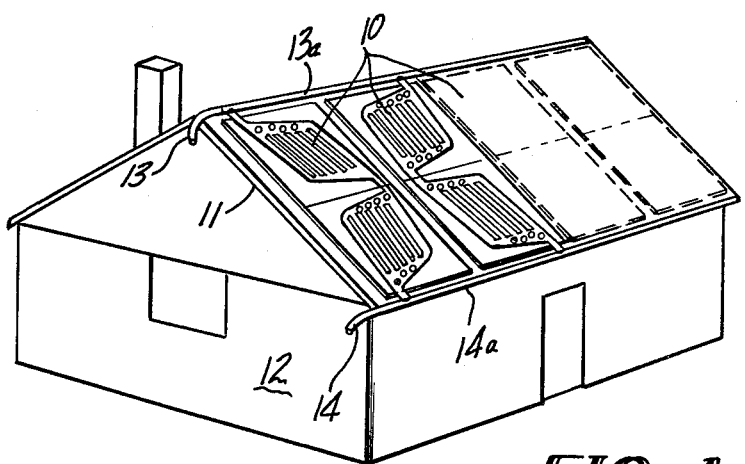
FIG. 1 is a diagram showing schematically the manner in which the panels of the present invention can be employed.

The panels of the present invention are preferably utilized in a solar heating system as shown in FIG. 1 wherein a plurality of panels of the present invention 10 are mounted on roof 11 of building 12 with conduits 13 and 14 connected in any convenient fashion to the equipment in the building, with the connections not shown. Thus, for example, cold water may go into conduit 13 from the building 12 by means of a conventional pump or the like. The water flows along common manifold 13a and is distributed into panels 10. The water flows through panels 10, is heated by means of solar energy, is collected in common manifold 14a, and flows into conduit 14. The heated water is then stored or utilized in a heat exchange system inside the building in a known manner. Naturally, if desired, the water flow may be reversed with the cold water entering via conduit 14 and collected via conduit 13. Alternatively, the solar heating unit of the present invention may be used or placed in any suitable environment, such as on the ground with suitable fasteners to prevent displacement by wind or gravity. The solar heating unit of the present invention may be used for residential heating purposes, such as in providing hot water in a residential environment. For example, three panels of the present invention having dimensions of 8 feet × 4 feet would efficiently supply an average household of four with hot water for home use. Alternatively, the solar panels of the present invention may be conveniently used for heating water for swimming pools or for preheating water for domestic gas or oil fired domestic hot water heaters. The fluid is preferably retained in a closed system with the water in the system heated in the solar unit and delivered into an insulated cistern or container so that the heated fluid may be stored up during sunshine for use on cool cloudy days or at night when the heating of the fluid in the panel will not be of sufficient degree to provide the desired heat at the point of use.

A thermostat not shown in desirably installed at the top of the solar heater and this thermostat may be set to turn on a circulating pump whenever the temperature reaches a predetermined reading. The pump will then pump the water through the system as generally outlined above.

Figure 2:
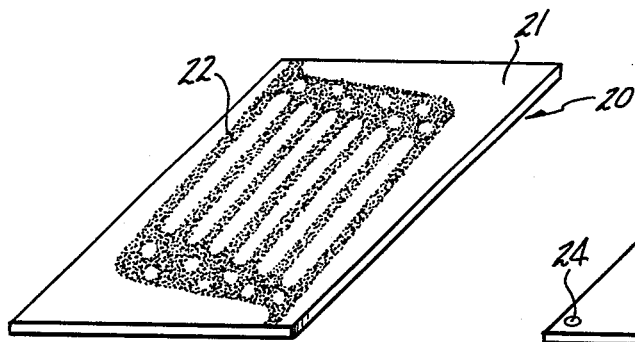
FIG. 2 is a perspective view of a sheet of metal having a pattern of weld inhibiting material applied to a surface thereof.
Figure 3:
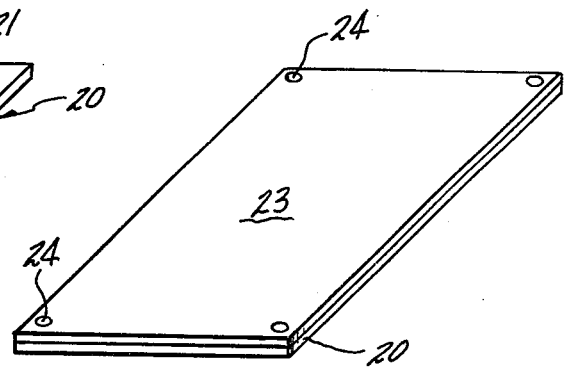
FIG. 3 is a perspective view of a composite metal blank wherein a second sheet of metal is superimposed on the sheet of metal shown in FIG. 2 with the pattern of weld inhibiting material sandwiched therebetween.
Figure 4:
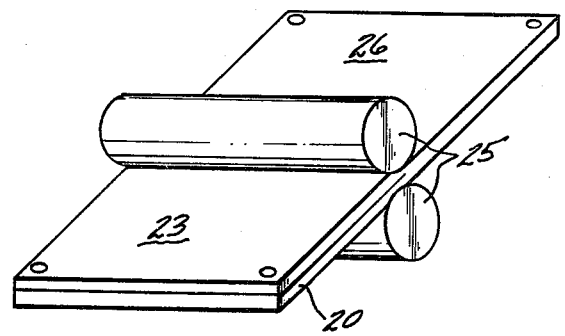
FIG. 4 is a schematic perspective view showing the sheets of FIG. 3 being welded together while passing through a pair of mill rolls.

As indicated above, the present invention contemplates a particularly preferred panel design for optimum efficiency in a solar heating system as described above. The metal panel or plate of the present invention is desirably fabricated by the ROLL-BOND®process as shown in U.S. Pat. No. 2,609,002. FIG. 2 illustrates a single sheet of metal 20 as aluminum or copper or alloys thereof, having applied to a clean surface 21 thereof a pattern of weld inhibiting material 22 corresponding to the ultimate desired passageway system. FIG. 3 shows the sheet 20 having superimposed thereon a second sheet 23 with a pattern of weld inhibiting material 22 sandwiched between the units. The units 20 and 23 are tacked together as by support welds 24 to prevent relative movement between the sheets as they are subsequently welded together as shown in FIG. 4 by passing through a pair of mill rolls 25 to form welded blank 26. It is normally necessary that the sheets 20 and 23 be heated prior to passing through the mill rolls to assure that they weld to each other in keeping with techniques well known in the rolling art.

Figure 6:
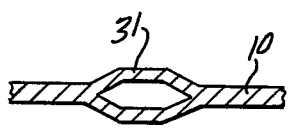
FIG. 6 is a sectional view taken along lines 6—6 of FIG. 5A.
Figure 7:
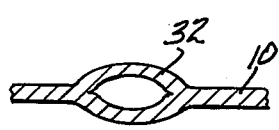
FIG. 7 is an alternate view showing a variation in the tube configuration similar to the view of FIG. 6.

The resultant blank 26 is characterized by the sheets 20 and 23 being welded together except at the area of the weld inhibiting material 22. The blank 26 with the unjoined inner portion corresponding to the pattern of weld inhibiting material 22 may then be softened in any appropriate manner as by annealing, and thereafter the blank may be cold rolled to provide a more even thickness and again annealed. The portions of the panel adjacent the weld inhibiting material 22 are then inflated by the introduction of fluid distending pressure, such as with air or water, in a manner known in the art to form a system of internal tubular passageways 30 corresponding to the pattern of weld inhibiting material as shown in FIG. 5. The passageways 30 extend internally within panel 10 and are disposed between spaced apart portions of the thickness of said panel. Thus, panel 10 comprises a hollow sheet metal panel or plate having a system of fluid passageways 30 for a heat exchange medium extending internally therein. If the passageways are inflated by the introduction of fluid distending pressure between flat die platens, the resultant passageways have a flat topped configuration 31 as shown in FIG. 6. If, on the other hand, passageways 30 are formed without the presence of superimposed platens the resultant passageway configuration has a semicircular shape 32 as shown in FIG. 7.

Figure 5A:
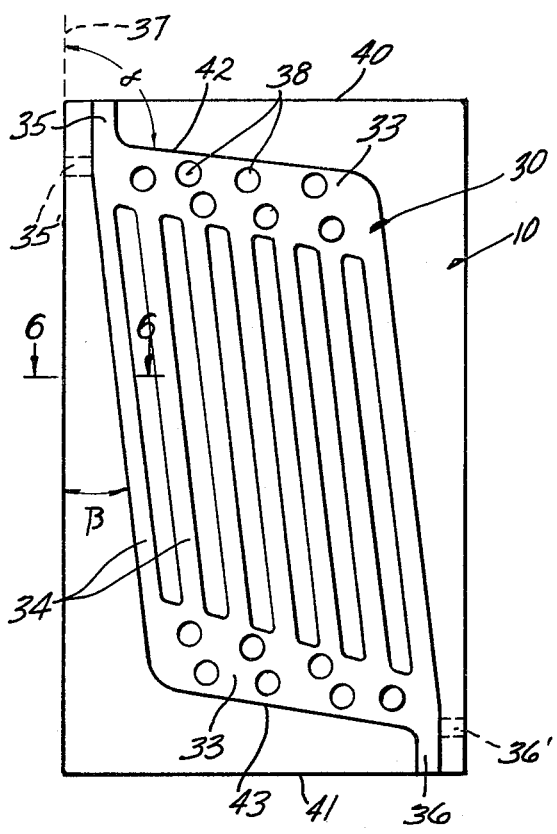
FIG. 5A is a top view showing the panel of the present invention having internal tubular passageways disposed between spaced apart portions of the thickness of the panel in the areas of the weld inhibiting material.

As shown in FIG. 5A, the passageways 30 include opposed headers 33 connected by connecting portions 34 of said passageways of substantially uniform cross section extending substantially longitudinally in panel 10 between headers 33 and interconnecting same, with the opposed headers 33 extending in a direction substantially transverse to said longitudinal passageways. Preferably, opposed headers 33 are connected by a plurality of spaced, parallel individual connecting portions 34 of said passageways extending between the headers.

In accordance with the present invention, the passageways include entry portion 35 and exit portion 36 extending from the opposite ends of headers 33 to opposed edges 40 and 41 of panel 10 to provide ingress and egress openings for the heat exchange medium. Headers 33 possess outer edges or boundary sides 42 and 43, respectively, defining the perimeter thereof adjacent entry portion 35 and exit portion 36, respectively, extending therefrom. It is a primary feature of the present invention that headers 33 and connecting portions 34 define angles of at least 91° and 1°, respectively, with respect to the direction of fluid flow, indicated by phantom line 37 in FIG. 5A as passing in the direction of a longitudinal edge of panel 10. Thus, the external angle $\alpha$ defined by line 37 and adjacent boundary side 40 of header 33 may generally range from 92° to 100°, and preferably from $92\frac{1}{2}$° to $97\frac{1}{2}$°, while the angle $\beta$ defined by line 37 and connecting portion 34, generally ranges from 2° to 10° and preferably from $2\frac{1}{2}$° to $7\frac{1}{2}$°. In all of the above instances where angles have been defined, it is to be understood that said angles are measured as they lie in the plane of the panel and comprise the convergence of the boundary side and connecting portion, respectively, with the longitudinal dimension of the panel represented by the line extended in phantom.

Figure 5B:
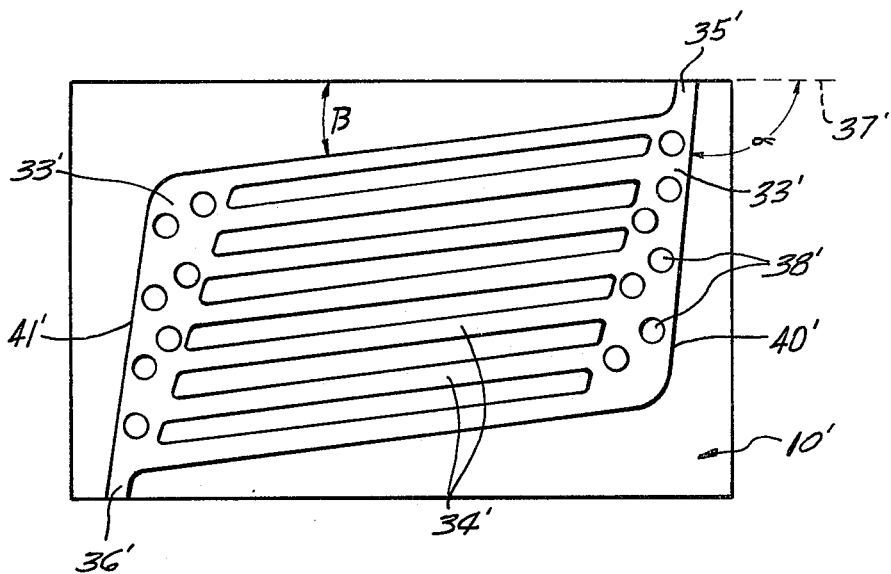
FIG. 5B shows the panel of FIG. 5A rotated 90° about an axis perpendicular to the plane of the panel.

The provision of angles $\alpha$ and $\beta$ and the corresponding inclines in both the headers and the connecting portions, enables the panel of the present invention to drain efficiently whether the panel is mounted with its longitudinal edge in either the vertical or the horizontal plane. Referring now to FIG. 5B, panel 10' is shown which is virtually structurally identical to panel 10 of FIG. 5A, with the exception that entry portion 35' and exit portion 36', shown in phantom in FIG. 5A, are designated in solid lines of FIG. 5B. As with panel 10 shown in FIG. 5A, panel 10' comprises headers 33' having outer edges or boundary sides 40' and 41', respectively, which define an angle $\alpha$ in convergence with the longitudinal dimension represented by phantom line 37', which is identical in size to that set forth in FIG. 5A. Likewise, angle $\beta$ defined between line 37' and adjacent connecting portion 34' may range in size in an identical manner to angle $\beta$ shown in FIG. 5A. This modification of entry and exit portions facilitates the stacking of panels 10' in the manner similar to that illustrated in FIG. 1 for panel 10. Essentially, then, panel 10' is merely panel 10 rotated 90° in the same plane, whereby the longitudinal dimension represented by line 37' resides in the horizontal rather than the vertical plane. The ability of the panel of the present invention to be mounted in the manner depicted in FIG. 5B confers additional versatility in spatial arrangement not possible with the panels employed in the prior art. Further, the achievement of proper drainage for internal fluids overcomes several problems noted heretofore. Thus, proper drainage mitigates the possibility of internal solution freezing in the unit with possible subsequent expansion and tube wall fracture. In addition, proper fluid drainage eliminates the possiblity of sediment collecting in the unit and provides a drain for collected gases entrained therein. This eliminates the potential of corrosion resulting from the collection of sediment and prevents the development of air locks resulting from the prolonged collection of entrained gases. Naturally, an efficiently drained unit facilitates the expeditious usage of available solar energy.

Figure 8:
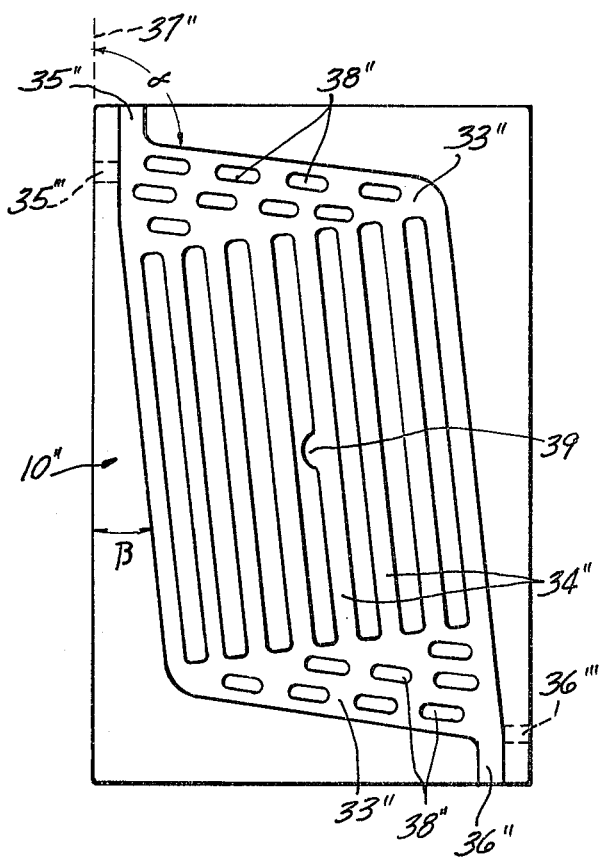
FIG. 8 is a top view showing an alternate embodiment of the present invention.

Referring again to FIG. 5A, panel 10 is illustrated as having bonded portions 38 situated in the midst of headers 33, representing areas where the metal has been welded together. Bonded portions 38 provide increased header strength, improved fluid flow control and directionality and an interruption in the flow of the heat exchange medium. This can be readily achieved in accordance with the present invention by simply omitting the placement of weld preventive material where bonded portions 38 are desired. As can be appreciated, a wide variety of patterns of bonded portions 38, both symmetrical and asymmetrical in design, may be selected and employed. Thus, for example, referring to FIGS. 5A and 5B, bonded portions 38 and 38', respectively, are randomly distributed throughout headers 33 and 33', whereas FIG. 8, illustrating a further alternate embodiment of the invention, depicts bonded portions 38'' which are set forth in a pattern of linear alignment so as to provide a plurality of fluid channels extending to respective connecting portions 34''.

The symmetrical design of the panels of the present invention makes the panels easier to handle so that either end may be employed as the upper portion thereof. Accordingly, though entry and exit portions 35 and 36, respectively, have been defined throughout, it is apparent that the functions are interchangeable. Similarly, the angling of both the headers and the connecting portions promotes drainage of the panel in any position of installation, and thereby enables the efficient operation of the panel regardless of the direction of extension of the entry and exit portions, as can be appreciated from a comparison of FIGS. 5A and 5B.

Referring again to FIG. 8 representing variation in the panel design of the present invention, headers 33'' are seen to possess a generally triangular configuration wherein the bases of the triangles are located adjacent the entry and exit portions 35'' and 36'', respectively. In addition, bonded portions 38'' are aligned so as to assist in the uniform distribution of fluid flow through headers 33''. Entry and exit portions 55''' and 36''' are shown in phantom on panel 10'', which may likewise be employed in a position 90° removed from that shown in FIG. 8. A further feature illustrated in FIG. 8 is the provision of a nodular expanded portion or nib 39 provided on panel 10'' at a point equidistant from all of the outer edges thereof. In the illustration of FIG. 8, nib 39 coincides with connecting portion 34'' and thereby appears as a bulge of that connecting portion. Nib 39 may serve as an alignment means in the manufacture of panels such as panel 10'' by the ROLL-BOND® *process.*

Naturally, several alternative designs may be envisioned by one skilled in the art in accordance with the concepts described above.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency and intended to be embraced therein.

What is claimed is:

1. A hollow sheet metal plate for use in a solar energy collector system having a system of fluid passageways for a heat exchange medium extending internally therein including opposed headers and passageways of substantially uniform cross section extending longitudinally in said plate in a direction transverse to and interconnecting said headers, including entry and exit portions extending from opposite ends of said headers to opposed edges of said panel to provide ingress and egress openings for a heat exchange medium, said headers possessing outer boundaries defining the perimeter thereof, wherein at least one of said boundaries lying adjacent the apex of said perimeter defines an external angle of at least 91° with respect to a longitudinal edge of said metal plate, and said longitudinally extending passageways are disposed at an angle of at least 1° with respect to said longitudinal edge along substantially the entire length thereof, said plate being characterized by efficient drainage of said heat exchange medium, wherein said angles define inclined headers and inclined connecting portions for uniform fluid distribution regardless of whether said longitudinal edge is located in a horizontal or a vertical plane.

2. A plurality of plates according to claim 1 including a common distribution manifold connected to each of said entry portions for distribution of said heat exchange medium into said plates, and a common collection manifold connected to each of said exit portions for collection of said heat exchange medium from said plates.

3. A plate according to claim 1 wherein said headers include a plurality of portions of said metal which are bonded together distributed throughout the headers to provide interruption in the flow of said heat exchange medium.

4. A plate according to claim 3 wherein said passageways include spaced, parallel individual connecting portions of said passageways extending longitudinally in said plate in a direction transverse to and interconnecting said headers.

5. A plate according to claim 3 wherein said longitudinal passageways include a plurality of portions of said metal which are bonded together to provide interruption in the flow of said heat exchange medium.

6. A plate according to claim 3 wherein said entry and exit portions are in alignment with said longitudinal edge.

7. A plate according to claim 3 wherein said entry and exit portions are transverse to said longitudinal edge.

8. A plate according to claim 3 wherein said headers define an angle of from 92° to 100°, and said connecting portions define an angle of from 2° to 10°, respectively, with respect to said longitudinal edge.

9. A plate according to claim 8 wherein said headers define an angle of from 92½° to 97½°, and said connecting portions define an angle of from 2½° to 7½°, respectively, with respect to said longitudinal edge.

* * * * *